United States Patent Office 3,712,979
Patented Jan. 23, 1973

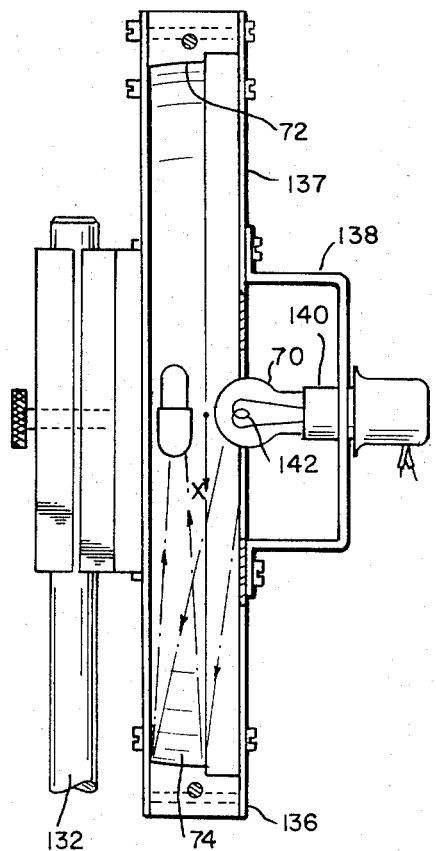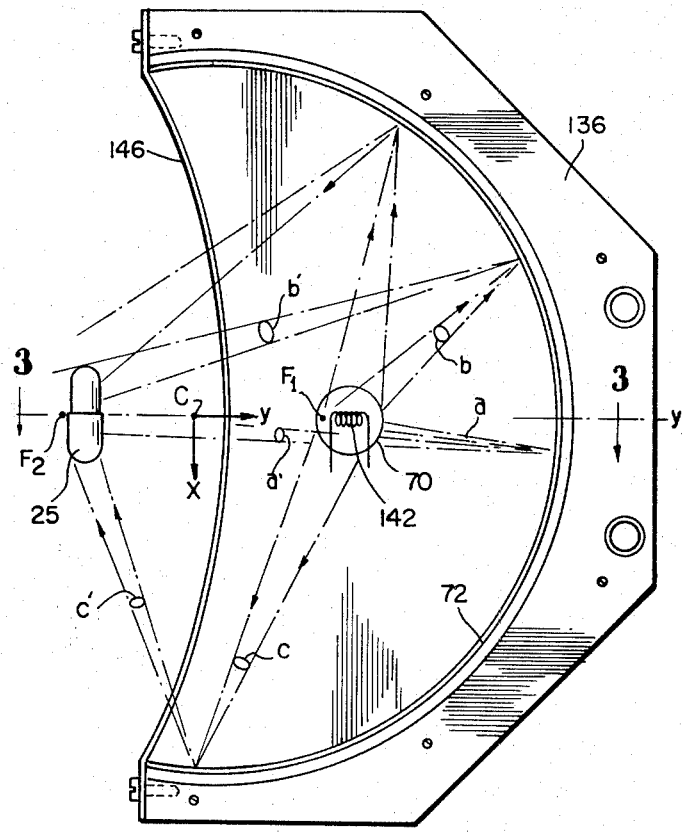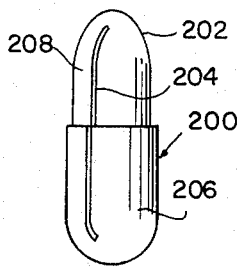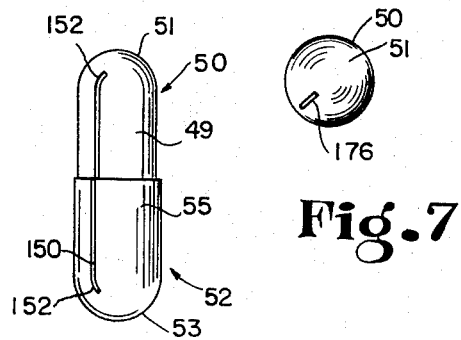

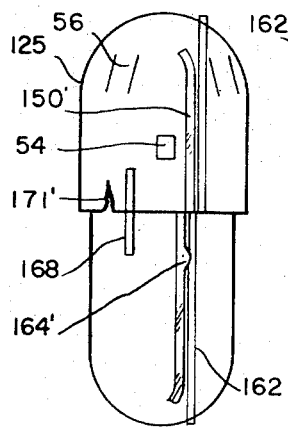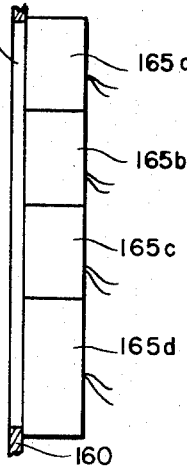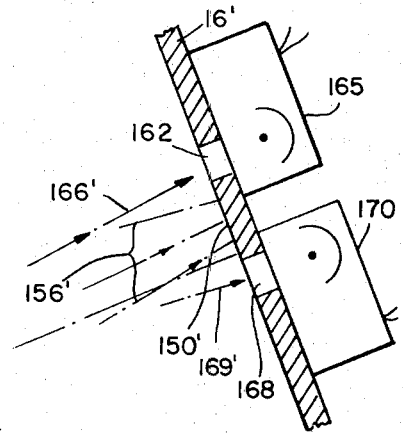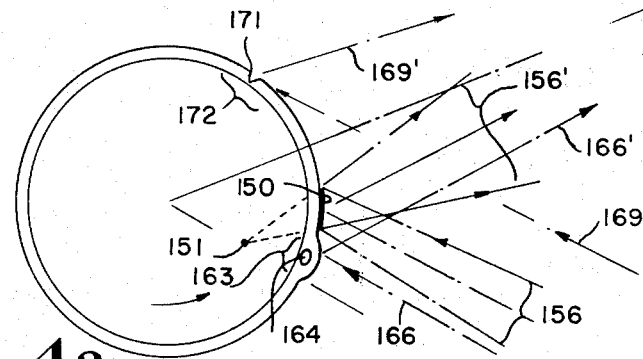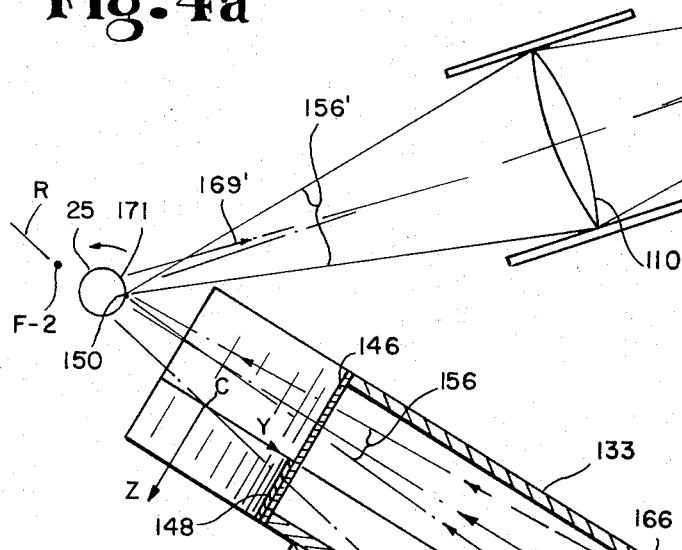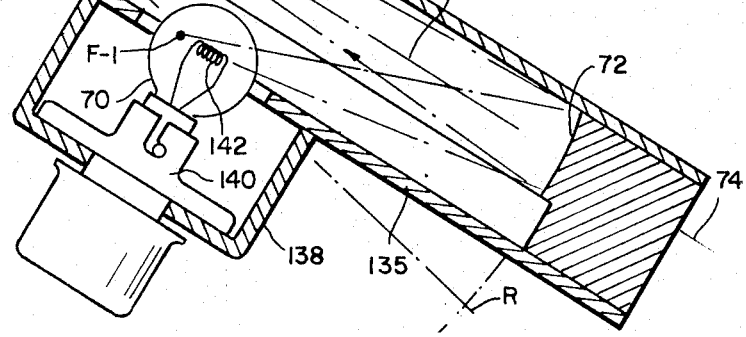

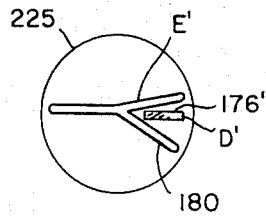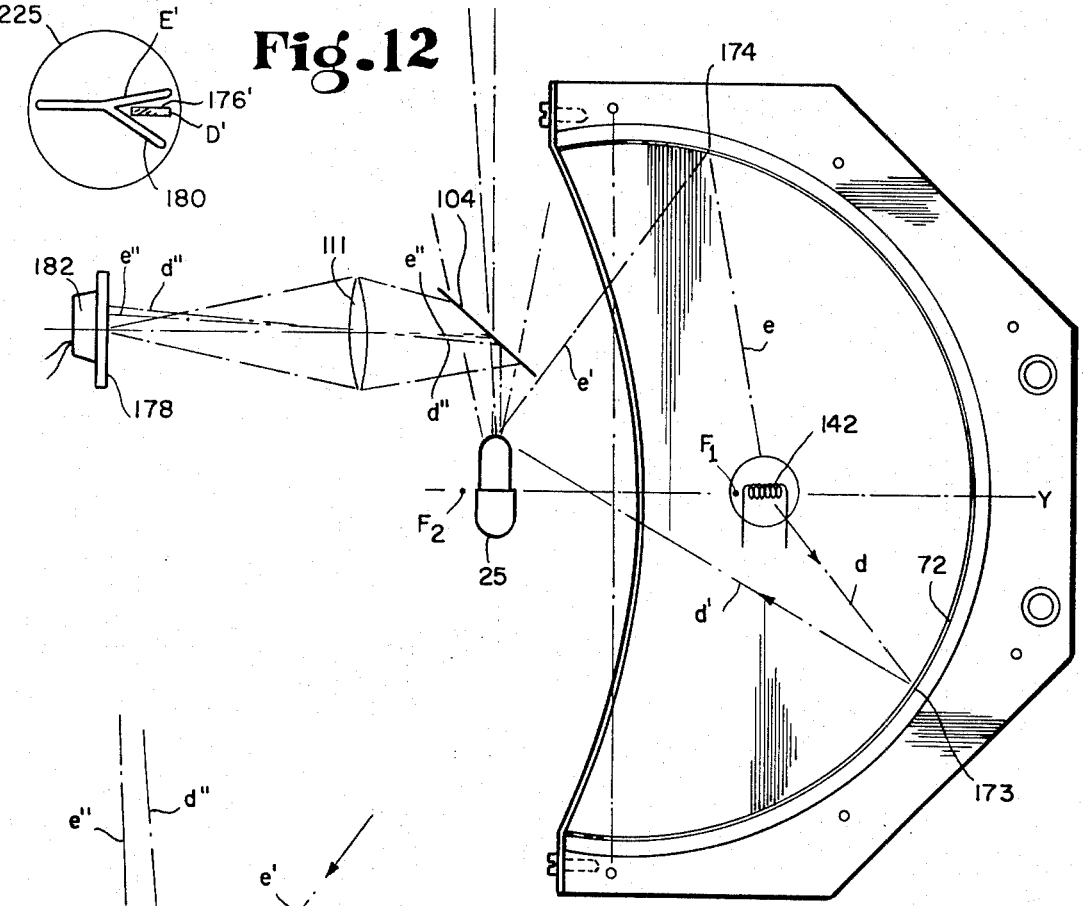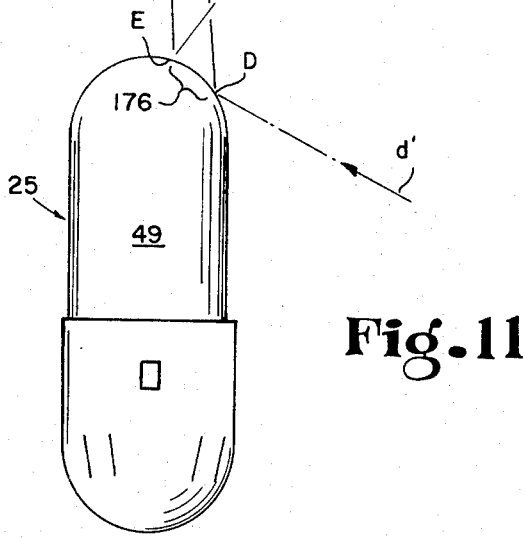
Fig.12
Fig.10
Fig.11

3,712,979
ILLUMINATION OF CONVEX SURFACES
Howard R. Padgitt, Park Ridge, Ill., assignor to Eli Lilly and Company, Indianapolis, Ind.
Filed Feb. 3, 1972, Ser. No. 223,199
Int. Cl. F21v 7/00
U.S. Cl. 240—41.35 R 20 Claims

ABSTRACT OF THE DISCLOSURE

An arcuate mirror in the form of an elongated narrow section of an ellipsoid is used to reflect light from a light source adjacent one focus of the ellipsoid onto a convex surface of a workpiece adjacent the other focus of the ellipsoid. The mirror surface is narrow transversely of a plane intersecting the workpiece but extends in an elongated arc of up to 180° or more in such plane, so as to direct light onto the workpiece surface in converging rays over a wide angle which may be of the order of, or exceed 180°. The workpiece is viewed by one or more viewing systems, and as seen thereby, the workpiece is illuminated with uniform intense light which is so directed as to produce specular reflection from the convex surface over an extended glare area of narrow width, in a pattern which varies with the shape of the surface and the direction from which it is viewed. The illumination is especially useful in inspecting objects having spherical or other three-dimensionally curved surfaces, and permits a single viewing system to observe defects over a wide area not possible with conventional illumination. On a medicinal capsule, viewed from the side, the mirror produces a narrow glare area extending the full length of its cylindrical side and into its rounded ends. On its spherical end, viewed end-on, the mirror produces glare over a radially elongated area. On a spherical ball, viewed in a direction normal to the plane of the mirror arc, the mirror produces a full half-circle of glare area.

BACKGROUND OF THE INVENTION

This invention relates to apparatus for illumination of convex surfaces such as cylindrical surfaces and especially spherical and other three-dimensionally curved surfaces, e.g., surfaces of revolution, for purposes such as inspection where it is desired to produce specular reflection from the surface over an extended area.

The shape of a convex surface, such as the spherical surface of a ball bearing or the rounded end of a medicinal capsule, is such that illumination thereof by a single light source from a particular direction will cause only a small spot of specular reflection in the direction of a single viewing system. The continuing curvature of surface areas surrounding the spot causes specular reflection from those areas to be reflected away from the direction of the viewing system. In an inspection system using such conventional lighting, defects in and adjacent such surrounding areas will fail to be observed by the viewing system because the light rays affected by such defects will not enter the viewing system. While it may be possible to use plural viewing systems or a multiplicity of light sources and thus to observe specular reflection from a plurality of spots on a convex surface this unduly complicates the mechanism and is less effective than the results provided by the present invention.

SUMMARY OF THE INVENTION

In accordance with the invention, a mirror in the form of a narrow, elongated curved strip is used to reflect light from a single intense light source onto a workpiece having a convex surface, so as to direct light onto the surface in converging rays over a wide angle of up to 180° or more in the plane of the longitudinal arc of the mirror. Preferably, the longitudinal curvature of the mirror is along an arc of an ellipse, and desirably the mirror is also curved transversely in a manner such that the reflective surface of the mirror is an ellipsoid. The light source and workpiece are desirably located adjacent the two foci of the ellipse or ellipsoid, as the case may be. The longitudinal curve of the mirror extends through a wide arc about the workpiece so that in effect it "wraps around" the workpiece surface. From the point of view of the workpiece, each point on the ellipsoidal mirror takes on the full intensity of the light source so that the workpiece receives high intensity light from all points on the mirror. Since the mirror wraps around the workpiece, light strikes the workpiece in rays which converge thereon from all points over a wide angle. Illumination of the convex surface in converging rays from all points on the mirror wrapped around the workpiece produces specular reflection from that surface into a single viewing system over a lineal glare area which is narrow transversely of the mirror and greatly extended in the direction of the plane of longitudinal curvature of the mirror. With the illumination thus provided, a single viewing system is able to view light variations caused by defects over a much larger portion of the surface than is possible with conventional illumination.

The improved illumination and viewing capability is useful with different inspection techniques. Inspection of true surfaces such as on ball bearings may be done by sensing variations in specularly reflected light, in which case the elongated and better defined glare line is advantageous. Inspection of medicinal capsules, on the other hand, is desirably done by rotating the capsule and viewing a diffusely lighted area close to but not including the glare area, and sensing specular reflection from surface deviations rotating through the viewing area. In this case, the improved illumination of the present invention enlarges the area which can be viewed by one viewing system and improves the ability to see the defects in the enlarged inspection area.

BRIEF DESCRIPTION OF THE DRAWINGS

The accompanying drawings illustrate the invention. In such drawings:

FIG. 1 is a side elevation with the cover plate removed of an illumination system embodying the invention, showing diagrammatically the positions of the light source and a medicinal capsule as the workpiece, in relation to the foci of the ellipsoidal mirror;

FIG. 2 is a front elevation of the illumination mechanism shown in FIG. 1, with the front window removed and with parts shown in section;

FIG. 3 is a horizontal section on the line 3—3 of FIG. 1, shown as part of a capsule inspection system including an optical viewing system shown diagrammatically;

FIGS. 4–a and 4–b are enlarged portions of the optical system of FIG. 3;

FIG. 5 is a side elevation of a capsule illuminated by the illumination system of FIGS. 1–3, as seen from the point of view of the optical viewing system of FIG. 3;

FIG. 6 is a side elevation like that of FIG. 5 showing an illuminated capsule having a parabolic end instead of a spherical end;

FIG. 7 is an end elevation of the illuminated capsule of FIG. 5, viewed axially from the top;

FIG. 8 is a view of the image of the capsule of FIG. 5 as it appears at the image plane of the viewing system of FIG. 3, showing the relationship of the glare line and the inspection mask openings;

FIG. 9 is a vertical section showing the relationship of the image plane mask and four photo detector devices used to inspect four areas of the capsule as seen in FIG. 8;

FIG. 10 is a view similar to FIG. 1 with a diagram of an end-inspection optical system for a capsule;

FIG. 11 is an enlarged portion of the diagram of FIG. 10;

FIG. 12 is a view showing the image of the capsule end as seen at the image plane of FIG. 10 and showing the relationship of the glare line to a form of mask opening used in the inspection system;

DETAILED DESCRIPTION OF THE PREFERRED EMBODIMENT

Figure 14:
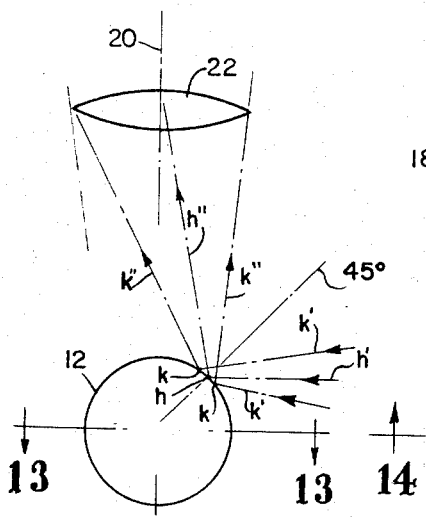
FIG. 14 is a diagrammatic sectional view on the line 14—14 of FIG. 13.

The illumination system shown in FIGS. 1-12 is shown as part of an optical inspection system for inspecting medicinal capsules. A representative capsule 25, as shown in FIGS. 1 and 5, comprises a body 50 having a generally cylindrical or slightly flaring side wall 49 and a hemispherical end 51. A cap 52 is telescopically received over the open end of the body 50 and includes a hemispherical end 53 and a side wall or skirt portion 55 which is generally cylindrical but commonly flares outward toward its open end. The cap and body each has an outer surface which closely approximates a surface of revolution about the axis of the capsule, and the two closed ends of the capsules are generally spherical in configuration. The cap may have built in deviations from true surfaces of revolution, as to provide internal bosses 54 and lands 56 (FIG. 8) for gripping the body to resist cap and body separation in handling and use.

For purposes of inspection, the capsule is spun on its axis in a fixed position, as by means shown in the copending application of Willard J. Vandenberg et al., Ser. No. 183,199, filed Sept. 23, 1971. For present purposes, the capsule may be considered to be spinning on its axis for inspection in the position shown in FIGS. 1, 2, 3, and 10.

The illumination system shown in FIGS. 1-11 comprises a mounting post 132 on which a clamp 134 supports a mirror block 136. The outer side wall 135 of the mirror block 136 carries a lamp housing 138 in which a lamp 70 is mounted in a prefocusing base 140.

The mirror block 136 has an inner surface 72 which is machined and polished to form a mirror in the form of a narrow strip or band extending longitudinally through a wide angle in the plane of the capsule axis. The opposite sides of the mirror block are closed by side walls 133 and 135 of metal or other opaque material, desirably having blackened non-reflective inner surfaces. The wall 135 contains a lamp opening and carries a lamp-mounting housing 138. A pre-focusing base 140 in the housing supports a lamp 70 in the lamp opening with its filament 142 in position to illuminate all portions of the mirror surface 72. The lamp 70 is located out of the path of light reflected from the mirror, and the side wall 135 is spaced from the adjacent edge of the mirror to facilitate this. The front of the mirror assembly is closed by a transparent window 146 which is desirably concave as shown to avoid undesirable reflections and to give full clearance for the capsule 25 and its supporting mechanism. The window is desirably blackened and made opaque along one side to form a mask 148 to block direct illumination from the lamp 70 to the capsule 25.

The mirror shown extends over an angle of approximately 160° about the center of the capsule 25, and curves longitudinally along the arc of an ellipse. The mirror is shaped to reflect light from the lamp 70 onto the capsule over the whole end-to-end surface of the capsule and to direct the light in rays which converge toward the capsule in the plane of the capsule so that the capsule receives light from all points of a substantially continuous narrow elongated area extending over a wide arc about the capsule. Desirably the reflective mirror surface is also transversely concave so that reflected rays therefrom converge in a transverse direction to concentrate light from its entire width onto the capsule. For uniformity of illumination, the length of the light paths from the lamp 70 to the mirror and thence to the capsule is approximately uniform in all parts of the system.

The illumination system which provides these results to a high degree is an ellipsoidal surface. The mirror surface 72 shown is a narrow band or strip formed as a section of the surface of an ellipsoid having its two foci F–1 and F–2 substantially in the positions shown in FIGS. 1 and 3. The central plane 74 of the mirror surface 72 is not on the axis of revolution R—R of the ellipsoid, but is at an angle thereto as shown in FIG. 3. The two foci F–1 and F–2 are, of course, on the axis of revolution R—R and such axis passes through the center C at the intersection of X, Y, and Z axes as shown, with reference to which the mirror surface may be machined. With respect to such X, Y, Z axes, the mirror surface shown is a section of an ellipsoid defined by the following mathematical equation:

$$0.0685288 X^2 \times 0.0598866 Y^2 + 0.0681306 Z^2 \\ -.0003710 YZ - 1.000000 = 0$$

The section is defined at one edge by its intersection with the X–Y plane of the coordinates, and extends transversely substantially twice the distance to the parallel central plane 74 containing the axis of the capsule 25.

The characteristic of the ellipsoidal mirror surface 72 is such that light emanating from the focus F–1 is reflected from any and all points of the mirror surface 72 to the opposite focus F–2. The lamp filament 142 is desirably coiled about the axis of revolution R—R, close to the focus F–1, and the mirror block 136 is so mounted that the capsule 25 lies close to the secondary focus F–2. Preferably, and as shown, both the lamp filament 142 and the capsule 25 are slightly defocused and located to the right of the foci. This arrangement places the capsule in the light rays converging toward the focus F–2. From the point of view of the capsule, each point on the surface of the narrow band of ellipsoidal mirror takes on substantially the full brightness of the filament 142, and the mirror is the source of light in the form of an elongated narrow area from all points of which rays of light are directed toward and converge onto the capsule 25. The area source of light is narrow circumferentially of the capsule, but extends in the plane of the capsule 25 through a wide angle of nearly 180° about the center of the capsule, and more than 180° about the center C of the ellipsoid.

The window 146 at the front of the mirror assembly is transparent over the whole width of the mirror surface 72 to pass all light from that surface 72 to the capsule 25, but its blackened edge portion or mask 148 blocks direct illumination of the capsule from the lamp 70.

The capsule surface is itself a smooth convex reflective surface, at least approximating a surface of revolution. Light from the mirror 72 will be specularly reflected by that capsule surface into the side- and end-viewing lenses from a lengthwise glare area on the capsule surface and will appear as an intense glare line. The narrow uniform width of the mirror will aid in causing the glare line to be uniform in width and sharply defined at its edges. The elongated arcuate shape of the mirror will cause the glare line to be substantially continuous from end to end along the surface of the capsule and to wrap around the curved shoulder and end portions; and this is of special importance for inspecting those portions.

FIG. 5 shows a capsule 25 as seen from the point of view of the side-scanning lens 110, when illuminated by the illumination system of FIGS. 1-2. This illumination produces on the capsule 25 a well defined narrow glare line 150 which extends axially along the surface of both the body 50 and the cap 52, with the portion on the cap 52 slightly offset from that on the body 50 because of the larger diameter of the cap 52. While a glare line on a cylindrical surface would normally be relatively narrow, the glare line 150 on the capsule is well defined and especially narrow by reason of the narrowness of the mirror 72 from which it is illuminated. In effect, the narrow glare line is an image of the narrow surface of the ellipsoidal mirror surface 72 produced by the convex reflective surface of the capsule.

The end 152 of the glare line 150 extend beyond the cylindrical portions 49 and 55 of the capsule 25 and up into the hemispherical end portions 51 and 53 of the body and cap. This is the result of the wrap around characteristics of the ellipsoidal mirror 72, in that that mirror extends in a wide angle of approximately 160° about the center of the capsule in the plane of the capsule. As shown in FIG. 1, a bundle of rays $a$ from the filament 142 which strike the mirror 72 at a point close to its centerline Y will be reflected as reflected rays $a'$ onto the side of the capsule 25, and this will produce specular reflection horizontally into the entrance pupil of the side-viewing lens 110. Also, a bundle of rays $b$ from the filament 142 which is reflected from a point on the mirror spaced upward from the horizontal axis Y will be reflected as a bundle of rays $b'$ which will strike the upper end of the capsule from an upward inclination, and such rays will cause specular reflection from the hemispherical end surface of the capsule in a generally horizontal direction into the same entrance pupil of the side-viewing lens 110. It is thus because of this wrap around light source arrangement that the glare line 150 on the capsule shown in FIG. 10 is caused to extend the full length of the cylindrical side surface and there-beyond into the hemispherical end surface. The same wrap around feature produces an elongated glare line on the end of the capsule as seen by an end-viewing lens 111, as shown in FIGS. 7 and 10, and this will be discussed in more detail later.

Inspection illumination of the side area of the capsule is effected as shown diagrammatically in FIGS. 3 and 4a, b. As has been described, the fialment 142 of the lamp 70 supplies light to the narrow band of ellipsoidal mirror 72, and from the point of view of the caspule 25 high intensity light is reflected from the full width of that band of mirror surface 72 in converging rays toward the capsule 25. A side-viewing lens 110 projects an image of the capsule 25 on the face of the mask 160, which is represented as the image 125 in FIG. 8. A thin wedge-shaped pencil of converging rays 156 are specularly reflected from the glare line area 150 on the capsule, as diverging rays 156', into the entrance pupil of the side-viewing lens 110, and such lens produces an image of the glare line area at an area 150' in the image plane on the face of the mask 160. The lens 110 shown diagrammatically in FIG. 3 is in practice a lens system, preferably one of high quality specifically designed for 1:1 magnification in this application. The plane in which it is focused can have a significant bearing on the results. For example, because of the divergence of the light rays 156' reflected from the convex specularly-reflecting surface area 150 of the capsule, the glare appears to come from a line source 151 inside the capsule where the divergent rays 156' intersect. The lens 110 may be focused on that glare line source 151 but for best results in some applications is preferably focused on the glare surface 150 of the capsule.

At the image plane, all the light rays 156' from the glare line area 150 which enter the lens 110 are directed to the glare line image area 150' on the mask, and since this portion of the mask is opaque, all such glare light is blocked. Close beside the glare line the mask contains an aperture 162, behind which a series of photo detectors 165a–d are located to sense light transmitted through the aperture 162. Specularly reflected light from the vicinity of the observed face of the spinning capsule normally does not enter the lens 110 and reach the mask aperture 162, provided the capsule has no defects. However, when a surface irregularity such as a bubble 164 rotates through the vicinity of the glare line area 150, as shown in FIG. 4a, a different condition will exist. The surface irregularity or bulge at the bubble 164 may cause some variation in the specularly reflected light in the image 150' of the glare line area 150, but any such variation at the glare-line image 150' on the mask 160 has no effect in the inspection process, since all light striking the mask at that area is blocked. However, as the bubble 164 approaches the glare line area 150 its surface irregularity or bulge will pass through a viewing area 163 corresponding to the aperture 162 and adjacent the glare area 150 and will cause rays of light such as the ray 166 to be specularly reflected as a reflected ray 166' directly into the aperture 162 in the mask 160. This produces a large increase in the light entering the aperture 162 and sensed by the photo detector 165, which causes a large variation or spike in the electrical output signal from the inspection sensing device.

The arrangement just described has been found effective to sense capsule imperfections such as bubbles, crimps, turned edges, telescopically masked capsules, and the like which cause variations from the circular configuration of the capsule surface and hence cause spectular reflection of the intense light into the aperture 162. The photo detectors at that aperture can also sense decreases in diffused light, such as is caused by splits, black spots, holes or cuts occurring in manufacture etc. However, it is preferable not to rely wholly on observation of such light-decreases by the detectors 165 which may be set to operate at high light intensity levels. For more reliable detection of such other imperfections, and especially splits and cracks at the edge of the capsule cap 52, the mask 160 is provided with a second aperture 168 and detector 170 responsive to light from a viewing area 172 positioned on the opposite side of the capsule-lens center line from the glare line area 150. A cut or split passing through that area 172 will cause a variation in the diffusely reflected light reaching the aperture 168, and this will activate the photo detector 170 located behind that aperture. As shown in FIG. 4, a light ray 169 strikes a cut 171 as it passes through the area 172 and this will produce variation in the light ray 169' which enters the aperture 168. The detector 170 is desirably set to respond to light decreases.

It will be seen that the cut-line observation area is substantially in the same transverse plane as the glare area 150. This permits both to be in focus for the lens 110. To obtain this result, the angle between the mirror plane 74 and the lens axis is desirably about 50°.

FIG. 8 shows an enlarged image 125 of a capsule as such image appears at the image plane at the face of the mask 162. The capsule is in inverted position by reason of the inversion caused by the lens 110. The glare line image 150' appears as a shaded line with its upper cap-section displaced to the right of the lower body section. A bulbous enlargement 164' of the glare line image represents the image of the bubble 164. The apertures of the mask 160 are superimposed on the capsule image. The principal aperture 162 is shown as an open linear area of narrow width having an upper section offset to the right of the lower section so that both sections lie close to and parallel with the glare line image 150'. The bulbous image 164' of the bubble 164 is shown to cross the lower section of the aperture 162 and represents the passage of light through such aperture to activate a photo detector 165. FIG. 8 also shows the image 171' of the edge split 171 on the cap of the capsule, and shows the aperture 168 in a position to receive light as the image 171' of the split passes the aperture 168.

The capsule is of the type in which the cap contains a pair of internal bosses 54 for producing separation resistance of empty capsules, and a series of internal lands 56 for producing separation resistance in filled capsules. These appear at different levels on the image 125 of the capsule as shown in FIG. 8 so that they may be detected by separate photo detectors placed at corresponding levels.

For detecting defects in the side-scanning system described, a plurality of detectors 165a–d are used behind the aperture 162, as shown in FIG. 9. These comprise an upper detector 165a disposed at a level to observe light reflected through the aperture 162 by the indentations or lands 56 and by defects in their vicinity, a second photo detector 165b for detecting light variations produced by the indentations 54 and by defects in their vicinity, a detector 165c for detecting defects over the upper portion of the capsule body image, and a detector 165d for detecting defects in the lower part of the body image. The latter is longer than the others to take account of normal variations in capsule length. Any of various types of photo detector devices might be used, including for example convenient edge-contact silicon photovoltaic cells.

The capsule-end illumination and a scanning system is shown diagrammatically in FIGS. 10–12. As explained in connection with FIGS. 1–2, the filament 142 lying substantially at the principal focus F–1 of the ellipsoidal mirror surface 72 directs rays of light to all points on that surface 72 and such rays are reflected toward the capsule 25 located substantially at the secondary focus F–2 of the ellipsoidal surface. That narrow, elongated ellipsoidal surface directs light toward the capsule 25 over a wide angle in the plane of the capsule so that the mirror light source is in effect wrapped around the ends of the capsule. Thus, in FIG. 1, the bundle of rays c are reflected from near the lower end of the mirror 72 and thence upward as rays c' toward the lower end of the capsule 25. This wrap around is especially important in the inspection of spherical and other three-dimensionally convex surfaces, since it produces a glare line area observable by a single scanning lens, such as the lens 111, which is of uniquely long length on the convex spherical end surface of the capsule shown. Illumination of that spherical surface from a spot light source, such as the filament 142 of the lamp 70, would produce only a small spot of specularly reflected light as that end surface is seen by the viewing lens system, and such illumination would provide only limited inspection of the end surface and fail to reveal all the defects. In contrast to this, the illumination system here shown produces a long linear area of specular reflection and greatly increases the effectiveness of the end inspection.

In the optical diagram of FIG. 10, a light ray d from the filament 142 is reflected from the mirror surface 72 at a point 173 well below the Y-axis, and is reflected as a ray d' toward the capsule 25 and strikes the spherical end surface of the capsule at a point D on its shoulder only a short distance above the line of juncture of such surface with the cylindrical side surface of the capsule. The capsule surface reflects the ray as a ray d'' upward to the plane mirror 104 which bends it into the entrance pupil of the end-viewing lens 111 of the top-end scanning system shown. Another ray of light e from the filament 142 is reflected from the ellipsoidal mirror surface 72 at a point 174 far above the Y-axis of the mirror and is reflected toward the capsule as a ray e' which strikes such capsule at a point E only a short distance from the axis of the capsule. The capsule surface specularly reflects the ray e'' to the plane mirror 104 and thence into the entrance pupil of the relay lens 111. The points D and E of incidence of the rays d' and e' and of reflection of the rays d'' and e'' are shown on the large scale FIG. 11 and it is seen that they lie far apart on the arcuate surface of the end of the capsule. The entire linear area 176 between the points D and E will of course be illuminated by light rays reflected from points on the mirror surface 72 between the points 173 and 174 at which the rays d and e are reflected. Such illumination will be specularly reflected from the entire linear arc a between the points D and E on the capsule end surface into the lens 111. A glare line is thereby produced on the spherical end of the capsule which extends substantially from the line of juncture of the end and side surfaces up to the axis of the capsule. The width of that glare line will be limited in part by the circumferential curvature of the end surface, but will also be limited by the narrowness of the mirror 72 from which the light rays are directed onto the capsule.

By this means, the wrap-around light source formed by the mirror 72 produces an elongated linear glare line area on the spherical or similarly curved end surface of the capsule as seen by the end-on viewing lens 111. Such lens 111 projects an image of the capsule end on the face of a mask 178. In that image 225, shown enlarged in FIG. 12, the glare line area appears as a radial linear area 176'. The mask 178 is arranged to block the glare light in the glare line area 176' and is provided with one or more apertures to pass light specularly reflected from the end of the capsule by defects therein. A preferred form of mask aperture 180 is superimposed on the image 225 of the capsule in FIG. 12, and consists of a generally Y-shaped opening in the mask, so positioned that the radial glare line area 176' lies between the radial arms of the Y and generally opposite from the leg of the Y.

A single photo detector 182 is positioned behind a mask 178 to detect variations in the light seen through the aperture 180. The detector may be made to sense both light increases and decreases, but it has been found effective to make the detector responsive to light increases. Large light increases at the aperture 180 will be caused by specular reflection from surface irregularities in a manner analogous to those caused by the bubble 164 in the side inspection, as explained in connection with FIGS. 3 and 4.

It is found that the arrangement described is effective to detect substantially all capsule end defects, including not only eccentric surface deformities but also concentric dimples in the end of the capsule.

The wrap around lighting system also produces good inspection results on capsules 200 having parabolic end portions 202 as shown in FIG. 6. As such capsules are seen by the side-viewing lens 110, the ellipsoidal mirror produces a glare line area 204 which extends along the cap 206 in the same manner as on the capsule in FIG. 10, and extends along the parabolic end portion of the body 208 in a continuous curved line leading well into the shoulder and rounded end of the body. In end-on view, as seen by the end-viewing lens 111, the capsules 200 present an appearance similar to that of the spherical-end capsules as shown in FIG. 7, except that the radial glare line area may be fore-shortened at its outer end.

In the inspection of parabolic capsules 200, the side-viewing mask 160 may have a principal aperture shaped to extend parallel with the curved glare line area 204 in the image of the capsule on the face of the mask.

OPERATION, FIGS. 1–12

Operation of the illumination system of FIGS. 1–12 is as follows:

A capsule 25 is spun on its axis in a fixed inspection position such as the position shown, is illuminated by the lighting system shown, and is viewed by side-scanning and end-scanning lens systems. All points on the elongated narrow band of ellipsoidal mirror surface 72 reflect high intensity light from the filament 142 adjacent the principal focus F–1 of the ellipsoid and direct that light toward the capsule adjacent the secondary focus F–2 of the ellipsoid. From the point of view of the capsule, each point on the surface of the mirror takes on the brightness of the filament and the capsule sees the mirror as the source of light, in the form of an elongated narrow band in and adjacent the plane of the capsule and extending in that plane through a wide arc of approximately 160°, including 80° on each side of a centerline perpendicular to the axis of the capsule. This directs high intensity light onto the capsule in the form of a thin but wide wedge of light rays which converge toward the capsule over a wide end-to-end angle. As the result, the side-scanning lens 110 sees on the capsule a glare line 150 of specularly reflected light which extends the full length of the cylindrical side surfaces of the capsule body 50 and cap 52 and has end portions which curve into the spherical or otherwise curved closed ends of the body and cap, as shown in FIGS. 5 and 6. The lens 110 produces an image of the illuminated capsule on the surface of the mask 160 at the image plane, as shown in FIG. 8. The mask blocks specularly reflected light in the image of the glare line area 150' but has a narrow aperture 162 closely beside that glare line image which passes light specularly reflected through that aperture from defects such as the bubble 164 (FIG. 4) and such light is sensed by one of the photo detectors 165 positioned behind the aperture 162.

The glare line area 150 is sharply-defined by reason of the narrow uniform width of the ellipsoidal mirror 72 from which it is illuminated.

On each end surface of the capsule, as seen end-on, the thin, wide-angle wedge of converging light rays from the ellipsoidal mirror 72 produces a long glare line area 176 which extends from a point close to the base of the end curve to a point close to the axis of the capsule. Specular reflection from that glare line enters the end-viewing lens 111 and appears as a generally radial bar 176' on the image 225 of the capsule end (FIG. 12). The light from that glare line is blocked by the mask 178, but light specularly reflected from surface imperfections in the vicinity of the glare line passes through the Y-shaped aperture 180 to be sensed by the photo detector 182. The optical system shown in FIGS. 10 and 11 for the top end of the capsule may be duplicated in a similar system for the bottom end of the capsule.

The light detectors 165, 170, and 182 are connected to control electrical circuits having output signals, and so arranged that variations in light reaching the detectors produces variations or spikes in the electrical signals. Such signals are processed and analyzed to control the acceptance or rejection of the capsules and to provide other information as desired.

The illumination system shown directs light onto the capsule in a beam of light rays which is thin circumferentially of the capsule but very wide in a plane containing the axis of the capsule, extending in that plane over a wide angle of approximately 80° in each direction from a radial centerline of the capsule so that the illumination "wraps around" the capsule endwise. In that beam, the rays converge both in the direction of the axial plane and in the direction transverse thereto. The thin, wide-angled beam of light rays produces, from the point of view of the side-scanning lens, a well-defined narrow glare line on the side of the capsule which extends the full length of the cylindrical side walls and into the curved ends of the capsule. It also produces on the ends of the capsule a long glare line which extends over a wide arc of the lengthwise curvature of the capsule end, as distinguished from the glare spot produced by a conventional light source which does not wrap around the capsule through the wide angle provided by the present illumination system.

The masks of the optical viewing systems block the light from such glare line areas, and such light is not used in the inspection. However, the production of the continuous, elongated, and well defined glare line areas characterize the illumination which, in the inspection, produces reflections from defects which reveal the presence of those defects with a degree of certainty and reliability not previously available.

Figure 13:
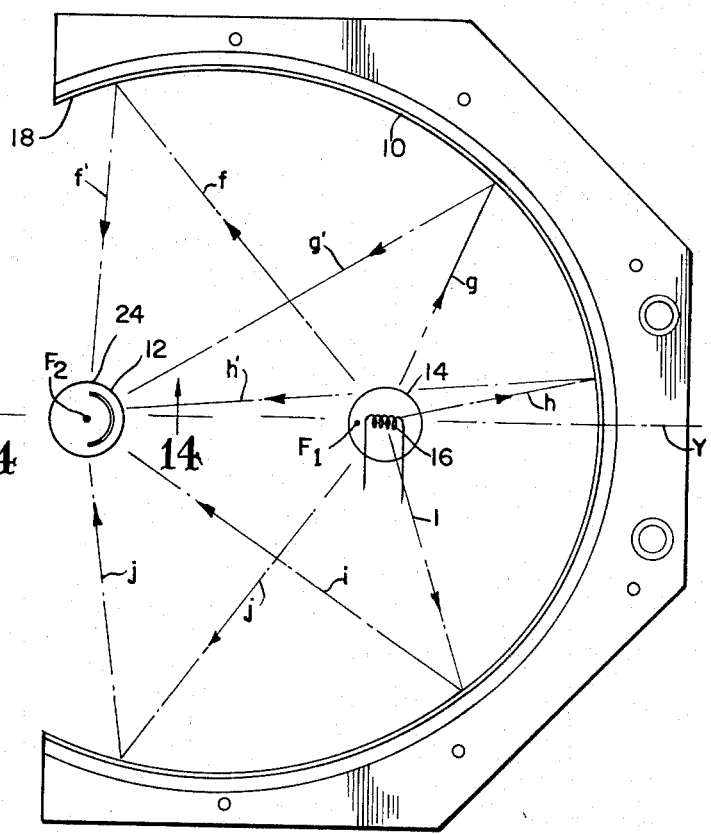
FIG. 13 is a side elevation like that of FIG. 1, showing illumination of a spherical workpiece such as a ball bearing, with an ellipsoidal mirror section of somewhat greater arcuate extent than in FIG. 1, and assuming the workpiece to be viewed from a direction normal to the plane of the paper.

In the modification of FIGS. 13 and 14, a narrow strip of ellipsoidal mirror 10 of greater arcuate extent than in FIGS. 1 and 10 is used to illuminate a spherical workpiece 12 such as a ball bearing. As in FIG. 1, a light source lamp 14 having a filament 16 is positioned adjacent the principal focus F-1 of the ellipsoidal surface 10 and the spherical workpiece or ball bearing 12 is positioned at the secondary focus F-2. The reflective surface of the mirror has the same ellipsoidal configuration as in FIGS. 1, 2 and 3, but is carried through a larger arcuate extent so that its ends 18 extend beyond the secondary focus F-2 at which the ball bearing 12 is positioned for illumination.

The ball bearing 12 is assumed to be viewed in the direction of an axis 20 perpendicular to the plane of the paper of FIG. 13 and intersecting such plane at the secondary focus F-2. The relationship is shown in FIG. 14, in which the viewing axis 20 is the axis of a viewing lens 22 and normal to the line 13—13 representing the central plane of the mirror 10 of FIG. 13.

In the system of FIG. 13, light rays from the filament 16 strike the mirror 10 over its entire arcuate extent and are reflected by that mirror surface toward the focus F-2 of the ellipsoid and the ball bearing 12 positioned at that focus. These are represented by the rays $f$–$j$ shown in FIG. 13, which are reflected as rays $f'$–$j'$ from the mirror surface onto the spherical surface of the ball bearing 12. From such spherical surface light is specularly reflected into the viewing lens 22 from a limited glare area determined by the configuration of the mirror 10 and the relative position of the viewing axis. Here, the glare area is an arcuate area 24 on the surface of the ball bearing 12 extending angularly through an arc of approximately 180° about the axis 20, and positioned between that axis and the periphery of the ball bearing 12.

As is seen in FIGS. 13 and 14, a light ray $h$ which strikes the mirror surface 12 adjacent the Y-axis is reflected as a ray $h'$ onto the ball bearing 12 and is specularly reflected therefrom as a ray $h''$ into the center of the lens 22. For such specular reflection, the point of its reflection from the spherical surface will be roughly 45° upward on that surface from the central plane 13—13. Other rays $k'$ reflected from points on the mirror surface 10 above and below the ray $h'$ in the plane of FIG. 14 will strike the spherical surface of the ball bearing 12 at points above and below the point of reflection of the ray $h'$, and will be reflected from that surface as diverging rays $k''$ into the viewing lens 22 on the axis 20. The bundle of rays represented by the rays $h'$ and $k'$ will produce specular reflection into the lens 22 over a short narrow arc adjacent the 45° point on the spherical surface of the ball bearing 12, and will thus produce a portion of the glare line area 24 shown on the ball bearing 12 in FIG. 13. Similar specular reflection will occur in all angular planes about the viewing axis 20, and this will produce specular reflection over the entire arcuate extent of the area 24 shown in FIG. 13. Thus, they ray $f$ from the lamp 14 will be reflected as a ray $f'$ from a point near the upper front end 18 of the mirror 10 and will strike the glare area 24 near its counterclockwise end in FIG. 13 and will be reflected upward into the viewing lens 22 in the same manner as the ray $h'$ shown in FIG. 14. Similarly, at the bottom of FIG. 13, the ray $j$ is reflected as a ray $j'$ which strikes the glare area 24 adjacent its clockwise end, and is specularly reflected into the viewing lens in the same manner as the ray $h'$. In each case, adjacent rays will cause specular reflection from other portions of the entire width of the glare area 24. In this way, the wrap-around mirror 10 reflects light from the lamp 14 to produce on the spherical surface of the ball bearing 12, as viewed along the axis 20, an arcuate band of specular reflection, represented by the glare area 24 in FIG. 13 and by the area K—K in FIG. 14.

In this modification of FIGS. 13 and 14, the viewing direction is normal to the central plane 13—13 of the ellipsoidal mirror 10, and this produces a glare area in the form of a continuous arcuate area extending fully 180° about the center of the image of the spherical workpiece. In the modification of FIGS. 10–12, the similarly illuminated spherical end surface of the capsule 25 is viewed from a viewing direction in the plane of the ellipsoidal mirror 72 instead of normal thereto, and in this case the specular reflection is produced over an elongated glare area 176′ (FIG. 12) which extends radially of the image of the spherical surface. Glare areas of other shapes, to suit various inspection and other purposes, may be obtained with the illumination apparatus of this invention by using different relationships between the central plane of the mirror and the viewing direction.

I claim:

1. Illumination apparatus for illuminating for inspection or the like a suitably-positioned workpiece having a convexly curved surface, comprising
   a light source, and
   a mirror having a reflective surface in the form of an elongated narrow strip, longitudinally curved along a wide arc about the light source and the workpiece position,
   said surface being arranged to reflect light from said light source onto a workpiece in such position in converging rays over a wide angle, and thereby to produce specular reflection in a single viewing direction from the convex surface on the workpiece over a glare area in the form of an elongated narrow strip corresponding to the form of the mirror surface.

2. Illumination apparatus as in claim 1 in which the light paths from the light source to the mirror and thence to the workpiece are substantially uniform at all points along the effective longitudinal length of the mirror.

3. Illumination apparatus as in claim 2 in which the mirror is longitudinally curved along an arc of an ellipse, the light source is adjacent the principal focus of the ellipse and the workpiece adjacent the secondary focus thereof.

4. Illumination apparatus as in claim 3 in which the mirror is transversely concave to thereby reflect inward toward the workpiece divergent light rays striking the mirror at transversely spaced points thereon.

5. Illumination apparatus as in claim 1 in which the reflective surface of the mirror is a section of an ellipsoid.

6. Illumination apparatus as in claim 5 in which the ellipsoid section is taken at an angle to the principal axis of the ellipsoid.

7. Illumination apparatus as in claim 6 in which the ellipsoid section forming the mirror surface is substantially at one side of a plane intersecting the center of the ellipsoid and the light source is disposed on the opposite side of said plane.

8. Illumination apparatus as in claim 5 in which the light source is adjacent the principal focus of the ellipsoid and the secondary focus lies in a central plane of the mirror surface.

9. Illumination apparatus as in claim 1 with the addition of a mask blocking direct illumination of the workpiece from the light source.

10. Illumination apparatus as in claim 6 with the addition of opaque means between the light source and the workpiece position to block direct illumination of the workpiece from the light source.

11. Illumination apparatus as in claim 1 in which said mirror is formed on the inner surface on a generally C-shaped block, side walls closing the sides of the block, the light source comprising a lamp mounted through one of said side walls.

12. Illumination apparatus as in claim 11 with the addition of a window closing the open side of the C-shaped block.

13. Illumination apparatus as in claim 12, in which the window is transparent over its area between the mirror and the workpiece and opaque over its area between the light source and the workpiece.

14. Illumination apparatus as in claim 6 in which the light source is a coiled filament having its coil axis substantially on the principal axis of the ellipsoid.

15. Illumination apparatus as in claim 5 in which the viewing direction is in the plane of longitudinal curvature of the mirror.

16. Illumination apparatus as in claim 5 in which the viewing direction is in a plane normal to the plane of longitudinal curvature of the mirror.

17. Illumination apparatus as in claim 5 in which the viewing direction is normal to the plane of longitudinal curvature of the mirror.

18. Illumination apparatus for illuminating for inspection or the like a convex surface on a workpiece, comprising
   a light source,
   a mirror having a reflective surface in the form of an elongated narrow section of an ellipsoid having its principal focus adjacent the light source and its secondary focus adjacent the position of the workpiece, whereby to reflect light from the source onto the workpiece in a beam of converging rays over a wide angle,
   said workpiece being viewed from a viewing direction toward which the convex surface of the workpiece specularly reflects light from the mirror,
   such specular reflection producing on the workpiece as viewed from said direction a glare area in the form of an elongated narrow image of the mirror.

19. Illumination apparatus as in claim 18 in which the convex surface of the workpiece is in the nature of a spherical surface and the viewing direction is in the plane of longiutdinal curvature of the mirror, whereby the mirror image appears as a radially extended area on the image of said convex surface.

20. Illumination apparatus as in claim 18 in which the convex surface of the workpiece is in the nature of a spherical surface and the viewing direction is at an angle to the curvature of the mirror, whereby the mirror image appears as an arcuately extended area on the image of said convex surface.

References Cited

UNITED STATES PATENTS

| | | | |
|---|---|---|---|
| 3,630,618 | 12/1971 | Jacoby | 356—237 X |
| 3,591,291 | 7/1971 | Greer et al. | 356—237 X |
| 3,578,977 | 5/1971 | Natelson | 356—237 X |

SAMUEL S. MATTHEWS, Primary Examiner

R. L. MOSES, Assistant Examiner

U.S. Cl. X.R.

240—2 R, 103 R; 356—237